United States Patent [19]

Nakamura et al.

[11] Patent Number: 4,728,723

[45] Date of Patent: Mar. 1, 1988

[54] PROCESS FOR PURIFICATION OF POLYPHENYLENE-SULFIDE

[75] Inventors: Yoshiaki Nakamura, Chiba; Kazuo Tedori, Itami; Hirobumi Ishikawa, Kobe, all of Japan

[73] Assignee: Tohpren Co., Ltd., Chiba, Japan

[21] Appl. No.: 28,584

[22] Filed: Mar. 20, 1987

[30] Foreign Application Priority Data

Mar. 24, 1986 [JP] Japan ............................ 61-066681

[51] Int. Cl.$^4$ ............................................. C08G 75/14
[52] U.S. Cl. ................................... 528/486; 528/388; 528/480; 528/487; 528/490
[58] Field of Search ............... 528/486, 490, 480, 487, 528/388

[56] References Cited

U.S. PATENT DOCUMENTS 3,407,182 10/1968 Hinton ............................... 528/490
4,071,509 1/1978 Edmonds ............................ 528/486

Primary Examiner—Harold D. Anderson
Attorney, Agent, or Firm—Parkhurst & Oliff

[57] ABSTRACT

Polyphenylene-sulfide having a much reduced content of impurities is prepared by adding an inorganic acid or organic acid to a slurry of polyphenylene-sulfide as-obtained by condensation reaction of an aromatic polyhalide compound with an alkali metal sulfide in the presence of a polar organic solvent, to adjust the pH of the slurry to a value not higher than 6, stirring the pH-adjusted slurry, filtering the slurry, and washing and drying the recovered solid.

6 Claims, No Drawings

PROCESS FOR PURIFICATION OF POLYPHENYLENE-SULFIDE

BACKGROUND OF THE INVENTION (1) Field of the Invention

The present invention relates to a purification process for removing impurities such as alkali metal ions from valuable polyphenylene-sulfide.

(2) Description of the Related Art

Polyphenylene-sulfide (hereinafter referred to as "PPS") has an excellent heat resistance, strength, rigidity and other properties and is used as an engineering plastic material in various fields. In the electrical and electronic industries in particular, a large increase is expected in the demand for PPS as the material to be used for the production of IC encapsulation materials, laminated boards and the like, because PPS has excellent characteristics such as precision moldability, heat resistance and flame retardancy. Of course, in these fields, preferably the content of an electroconductive impurities such as an alkali metal compound is as low as possible. In PPS now marketed, the alkali metal ion content is 1,000 to 4,000 ppm, and accordingly, a reduction of the alkali metal ion content is desired.

The alkali metal ion referred to in the present invention means that derived from an alkali metal halide formed in the production of PPS and an unreacted alkali metal sulfide. These alkali metal compounds are combined intimately and tightly with PPS and are very difficult to remove them from PPS. Accordingly, various processes for removing alkali metal compounds from PPS have been proposed, as disclosed in Japanese Unexamined Patent Publications No. 57-108,135, 57-108,136 and 59-219,331. However, these processes are complicated and the removal effect is not satisfactory.

Namely, PPS once prepared is combined tightly and intimately with impurities such as alkali metal compounds and separation of the impurities is not easy. In the above-mentioned conventional processes for removing impurities from PPS, removal of impurities from PPS once prepared is intended, and therefore, the steps are inevitably complicated.

SUMMARY OF THE INVENTION

It is a primary object of the present invention to obtain PPS having a very low impurity content by incorporating a purifying step for removing impurities into the process for the preparation of PPS.

In accordance with the present invention, there is provided a process for the purification of polyphenylenesulfide, which comprises adding an inorganic or organic acid to a slurry of polyphenylene-sulfide as-obtained by condensation reaction of an aromatic polyhalide compound with an alkali metal sulfide in the presence of a polar organic solvent to adjust the pH of the slurry to a value not higher than 6, stirring the pH-adjusted slurry, filtering the slurry, and water-washing and drying the recovered solid.

DESCRIPTION OF THE PREFERRED EMBODIMENTS

The condensation reaction of an aromatic polyhalide compound and an alkali metal sulfide in the presence of a polar solvent can be carried out according to a known process disclosed in, for example, Japanese Examined Patent Publication No. 45-3,368 or 52-12,240. As the aromatic polyhalide compound, there can be mentioned, for example, p-dichlorobenzene, m-dichlorobenzene, 4,4'-dichloro-diphenyl-sulfone, p-dibromobenzene, m-dibromobenzene, 1,2,3-trichlorobenzene, 1,2,4-trichlorobenzene, 2,5-dichlorotoluene and 1-chloro-4-bromobenzene. As the alkali metal sulfide, there can be mentioned, for example, sodium sulfide. As the polar solvent, there can be mentioned, for example, organic amides such as N-methylpyrrolidone, caprolactam and N-ethylcaprolactam.

By the "PPS slurry as-obtained by the condensation reaction" is meant a slurry of PPS obtained by the condensation reaction, which contains an alkali metal halide formed by the reaction. This slurry may be either in the as-obtained state containing the polar solvent, or a slurry formed by separating the polar solvent from the solvent-containing as-obtained slurry and adding water to the residue cake.

As the inorganic acid, there can be mentioned hydrochloric acid, sulfuric acid, sulfurous acid, nitric acid, nitrous acid, phosphoric acid and the like, and as the organic acid, there can be mentioned lower fatty acids such as acetic acid and oxalic acid. It is important that the acid be added in such a manner that the pH value of the slurry is not higher than 6, preferably from 5 to 1.

In the purification of the present invention, a satisfactory result can be obtained at ambient temperature, but the purification can be carried out under heating according to need. The slurry of as-obtained PPS is washed with stirring at a pH value not higher than 6, and the slurry is directly filtered to form a wet cake. The solvent may be removed from this cake by heating according to need, but removal of the solvent is not particularly necessary. Namely, alternatively the filter cake is directly dispersed in water, and the dispersion is stirred to effect washing and the dispersion is then filtered. This washing is conducted until the slurry becomes neutral. If necessary, the filter cake may be dispersed in water again, and water washing and filtration may be repeated. Water and the residual solvent contained in the wet cake obtained by conducting water washing to the neutral state are removed by heating, preferably under a reduced pressure, to obtain dry PPS.

The present invention is characterized in that the purification step is combined in the process for the preparation of PPS, and according to the present invention, by washing the PPS slurry as-obtained by the condensation reaction in the preparation process at a pH value not higher than 6 with stirring, PPS having much reduced contents of the alkali metal halide and the unreacted alkali metal sulfide can be obtained. On the other hand, even if PPS prepared according to the known process, which is once separated and contains large quantities of impurities, is washed with water at a pH value not higher than 6 as in the present invention, a substantial effect of removing impurities cannot be attained, although the reason for this is not clear. In other words, an excellent effect can be attained by introducing the purification step of the present invention into the process for the preparation of PPS.

Furthermore, in most of the above-mentioned conventional processes for removing impurities from once-prepared PPS, the treatment is carried out at a high temperature of about 200° C., and where the unreacted alkali metal sulfide is present as an impurity, since the treatment temperature is high, there is a risk of a deterioration of formed PPS due to the reaction with the unreacted alkali metal sulfide. In contrast, in the process of the present invention, since a satisfactory result can be obtained at ambient temperature, elevation of the temperature is not particularly necessary and there is no risk of a deterioration of PPS.

The present invention will now be described in detail with reference to the following examples that by no means limit the scope of the invention.

All "percentages" and "parts" in the examples are by weight.

EXAMPLE 1

Equimolar amounts of p-dichlorobenzene and sodium sulfide were reacted in the presence of N-methyl-2-pyrrolidone (NMP) according to known procedures, and 10% aqueous sulfuric acid was added to the obtained PPS slurry at 150° C. with stirring to prepare the slurry having a pH value of from 7 to 1 shown in Table 1. The slurry was stirred for 1 hour and then filtered. NMP present in the thus-obtained wet cake was evaporated. Then, 5 parts of water was added to 1 part of the obtained solid to form a slurry, the slurry was filtered and washed with water, and water was evaporated to dryness from the resulting wet cake. The Na ion content in the thus-obtained PPS was determined. The results are shown in Table 1.

TABLE 1

| pH Value | Na Ion Content in PPS |
|---|---|
| 7 | 1025 ppm |
| 5 | 112 ppm |
| 3 | 41 ppm |
| 1 | 120 ppm |

Note
The Na ion content was measured by a atomic absorption spectrophotometer with respect to an aqueous solution of the residue obtained by firing PPS.

EXAMPLE 2

The procedures of Example 1 were repeated in the same manner except that 35% aqueous hydrochloric acid was used instead of 10% aqueous sulfuric acid for adjustment of the pH value. The Na ion content in the thus-obtained PPS was measured. The results are shown in Table 2.

TABLE 2

| pH Value | Na Ion Content in PPS |
|---|---|
| 7 | 950 ppm |
| 5 | 105 ppm |
| 3 | 30 ppm |
| 1 | 95 ppm |

EXAMPLE 3

The pH value of the reaction slurry of PPS obtained according to the same process as described in Example 1 was adjusted by using 10% aqueous sulfuric acid as in Example 1, the slurry was filtered, and 2 parts of water was added to 1 part of the obtained wet cake to form a slurry. Then, the slurry was subjected to filtration and water washing, and water was evaporated to dryness from the obtained wet cake. The Na ion content in the thus-obtained PPS was determined. The results are shown in Table 3.

TABLE 3

| pH Value | Na Ion Content in PPS |
|---|---|
| 7 | 630 ppm |
| 5 | 36 ppm |
| 3 | 28 ppm |
| 1 | 45 ppm |

EXAMPLE 4

The pH value of the reaction slurry of PPS obtained according to the same process as described in Example 1 was adjusted to 4 by adding 10% aqueous phosphoric acid to the slurry at 150° C. with stirring, and the slurry then stirred for 1 hour. Then, the slurry was post-treated in the same manner as described in Example 1. The Na ion content in the thus-obtained PPS was 135 ppm.

EXAMPLE 5

In the same manner as described in Example 4, the pH value of the reaction slurry of PPS was adjusted to 4 by using 10% aqueous phosphoric acid, and the filtration and subsequent treatments were carried out in the same manner as described in Example 3. The Na ion content in the thus-obtained PPS was 64 ppm.

EXAMPLE 6

The pH value of the reaction slurry of PPS obtained according to the same process as described in Example 1 was adjusted to 5 by adding 30% aqueous acetic acid to the slurry at 150° C. with stirring, and the slurry then stirred for 1 hour. The slurry was post-treated in the same manner as described in Example 1. The Na ion content in the thus-obtained PPS was 450 ppm.

EXAMPLE 7

NMP was separated by filtration from the reaction slurry of PPS obtained according to the same process as described in Example 1, and 2 parts of water was added to 1 part of the resulting wet cake to form a slurry. Then, 10% sulfuric acid was added to the slurry to adjust the pH value to 3 and the slurry was stirred for 1 hour, followed by filtration and water washing. Water was evaporated to dryness from the obtained wet cake. The Na ion content in the thus-obtained PPS was 50 ppm.

COMPARATIVE EXAMPLE

The reaction slurry of PPS obtained according to the same process as described in Example 1 was directly filtered without performing the adjustment of the pH value, NMP was evaporated from the wet cake, and 10 parts of water was added to 1 part of the obtained solid to form a slurry, followed by filtration and water washing. Water was evaporated to dryness from the resulting wet cake. The Na ion content in the thus-obtained PPS was 3,000 ppm.

We claim:

1. A process for the purification of polyphenylenesulfide, which comprises adding an inorganic acid or organic acid to a slurry of polyphenylenesulfide as-obtained by condensation reaction of an aromatic polyhalide compound with an alkali metal sulfide in the presence of a polar organic solvent, to adjust the pH of the slurry to a value not higher than 6, stirring the pH-adjusted slurry, filtering the slurry, and water-washing and drying the recovered solid.

2. The process according to claim 1 wherein the pH of the slurry is adjusted to a value of 5 to 1 by the addition of an inorganic acid or organic acid.

3. The process according to claim 1 wherein the slurry as-obtained by the condensation reaction is a slurry in the as-obtained state containing the polar solvent.

4. The process according to claim 1 wherein the slurry as-obtained by the condensation reaction is a slurry formed by separating the polar solvent from the solvent-containing as-obtained slurry and adding water to the residue cake.

5. The process according to claim 1 wherein the procedures of filtering the slurry and water-washing the recovered solid are repeated before drying the recovered solid.

6. The process according to claim 1 wherein the steps of adding the acid to the slurry, stirring the pH-adjusted slurry, filtering the slurry, and water-washing and drying the recovered solid are carried out at from ambient temperature to 200° C.

* * * * *